United States Patent
Jang et al.

(10) Patent No.: US 10,205,681 B2
(45) Date of Patent: Feb. 12, 2019

(54) METHOD FOR OPERATING CONTROLLER AND SWITCH FOR RELIEVING NETWORK FAILURE FROM SDN, AND CONTROLLER AND SWITCH THEREFOR

(71) Applicant: Samsung Electronics Co., Ltd, Gyeonggi-do (KR)

(72) Inventors: Hyun-Woo Jang, Gyeonggi-do (KR); Ki-Beom Park, Gyeonggi-do (KR); Feng Zhu, Gyeonggi-do (KR); Byeong-Soo Yeon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 151 days.

(21) Appl. No.: 15/037,046

(22) PCT Filed: Nov. 10, 2014

(86) PCT No.: PCT/KR2014/010741
§ 371 (c)(1),
(2) Date: May 16, 2016

(87) PCT Pub. No.: WO2015/072709
PCT Pub. Date: May 21, 2015

(65) Prior Publication Data
US 2016/0294734 A1 Oct. 6, 2016

(30) Foreign Application Priority Data
Nov. 15, 2013 (KR) .................. 10-2013-0138798

(51) Int. Cl.
*H04L 12/24* (2006.01)
*H04L 12/939* (2013.01)
(Continued)

(52) U.S. Cl.
CPC ........ *H04L 49/555* (2013.01); *H04L 41/0654* (2013.01); *H04L 45/22* (2013.01); *H04L 45/28* (2013.01); *H04L 43/10* (2013.01)

(58) Field of Classification Search
CPC ... H04L 49/555; H04L 41/0654; H04L 45/22; H04L 45/28; H04L 43/10; H04L 43/0811;
(Continued)

(56) References Cited

U.S. PATENT DOCUMENTS

2007/0180104 A1* 8/2007 Filsfils .................. H04L 45/02
                                                                    709/224
2008/0037436 A1   2/2008 Liu
(Continued)

OTHER PUBLICATIONS

International Search Report dated Feb. 5, 2015 in connection with International Application No. PCT/KR2014/010741; 5 pages.
(Continued)

*Primary Examiner* — Kwang B Yao
*Assistant Examiner* — Hardikkumar D Patel

(57) ABSTRACT

The present disclosure relates to a pre-$5^{th}$-Generation (5G) or 5G communication system to be provided for supporting higher data rates beyond $4^{th}$-Generation (4G) communication system such as Long Term Evolution (LTE). A controller and a switch for network failure relieving from a software-defined networking (SDN) is provided. A method for operating the controller includes: transmitting, to the switch, path information for at least one packet and a session establishment message to establish a session for detecting a link failure of the at least one packet based on information regarding a capability of detecting a link failure of the switch. The method also includes receiving, from the switch, a session status message regarding a status of the session. If the status of the session is identified as the link failure, updated path information for the at least one packet based on information of the session is transmitted to the switch.

18 Claims, 20 Drawing Sheets

(51) Int. Cl.
*H04L 12/703* (2013.01)
*H04L 12/707* (2013.01)
*H04L 12/26* (2006.01)

(58) Field of Classification Search
CPC ......... H04L 41/06; H04L 45/02; H04L 45/04;
H04L 12/939; G06F 15/173; G06F 15/16;
G06F 7/04; H04J 1/16
See application file for complete search history.

(56) References Cited

U.S. PATENT DOCUMENTS

| | | |
|---|---|---|
| 2010/0202297 A1 | 8/2010 | Liu et al. |
| 2011/0238817 A1* | 9/2011 | Okita .................... H04L 41/142 709/224 |
| 2011/0286324 A1 | 11/2011 | Bellagamba et al. |
| 2012/0106359 A1 | 5/2012 | Raszuk |
| 2013/0028073 A1 | 1/2013 | Tatipamula et al. |
| 2013/0114402 A1 | 5/2013 | Ould-Brahim et al. |
| 2013/0170336 A1* | 7/2013 | Chen ....................... H04L 12/44 370/221 |
| 2014/0181292 A1* | 6/2014 | Venkataswami .... H04L 41/0677 709/224 |
| 2014/0269260 A1* | 9/2014 | Xue ........................ H04L 41/12 370/225 |

OTHER PUBLICATIONS

Written Opinion of the International Searching Authority dated Feb. 5, 2015 in connection with International Application No. PCT/KR2014/010741; 6 pages.

* cited by examiner

| Flow Header | Priority | Action | Timeout |
|---|---|---|---|
| Dst ip: Host X | 1 | Output to Port1 | 1 second |
| Dst ip: Host X | 2 | Output to Port2 | 1 second |

FIG.12

| Session ID | Local IP | Peer IP |
|---|---|---|
| 1 | A.A.A.A | A.A.A.B |
| 2 | C.C.C.C | C.C.C.D |

FIG.13

| Session ID | Local IP | Peer IP | Parent Flow ID |
|---|---|---|---|
| 1 | A.A.A.A | A.A.A.B | Switch1-1 |
| 2 | C.C.C.C | C.C.C.D | Switch1-1 |

FIG.14

METHOD FOR OPERATING CONTROLLER AND SWITCH FOR RELIEVING NETWORK FAILURE FROM SDN, AND CONTROLLER AND SWITCH THEREFOR

CROSS-REFERENCE TO RELATED APPLICATION(S)

The present application claims priority under 35 U.S.C. § 365 to International Patent Application No. PCT/KR2014/010741 filed Nov. 10, 2014, entitled "METHOD FOR OPERATING CONTROLLER AND SWITCH FOR RELIEVING NETWORK FAILURE FROM SDN, AND CONTROLLER AND SWITCH THEREFOR", and, through International Patent Application No. PCT/KR2014/010741, to Korean Patent Application No. 10-2013-0138798 filed Nov. 15, 2013, each of which are incorporated herein by reference into the present disclosure as if fully set forth herein.

TECHNICAL FIELD

The present disclosure relates to a technology of establishing a transmission path of data in an Software-defined networking (SDN) and, more particularly, relates to a technology for, in case where network failure occurs, detecting the network failure within a maximally fast time and providing intelligent protection in the SDN.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SDN is a software technology of abstracting the concept of a network in a distributed or cloud system and providing a Quality of Service (QoS) through control and management for propagating data. The SDN technology is a technology for basically solving a network cost and complexity by providing a network-centric management technology through physically decoupling a controller with a switch.

SDN is a technology developed to improve speed, stability, energy efficiency, security, etc. in a software manner in a network system that depends on hardware such as an existing router or switch, etc. and is based on a concept called OpenFlow. OpenFlow is a technology of separating a packet forwarding function of a network equipment and a controller function by a standard interface and providing the openness of a network, and defines a packet data protocol among a controller and switches.

SDN decides a transmission path in accordance with each flow entry information of a switch. At this time, at network failure occurrence, if receiving a propagation of an event message propagated from the switch, a controller reflects corresponding message information, to generate new flow entry information for packet forwarding in accordance with a routing policy and algorithm of the controller and provide the corresponding flow entry information to the lower switches.

However, in the existing SDN, if network failure takes place, the corresponding switches frequently exchange event messages with the controller. Actual distances among the switches and the controller physically are distant away and therefore, a considerably large propagation delay is generated at the time of message exchange. Also, for the sake of flow entry information generation, even a processing delay for internal algorithm calculation is generated in the controller. These factors can become the cause of a considerable overhead at fast packet forwarding.

Owing to this, the following problems often take place in the SDN.

Firstly, according as the number of the switches to manage in the controller increases and the coverage of the controller gets wide, a physical distance between the controller and the switch gets distant away more and more. As a result, when the switch propagates a message to the controller at event occurrence, a propagation delay increases more and more.

Secondly, the controller performs the shortest path forwarding in accordance with an internal routing algorithm. However, due to a topology change by a Spanning Tree Protocol (STP), a topology change by link timeout, a flow expiration notification, and other various events taking place in the switch, an overhead can be generated in the controller and thus, lead to a result of making long a fail-over time at network failure occurrence. That is, to prevent the generation of a loop in the switch, the SDN closes a port of logical one portion of a redundant line, and again opens the closed port at problem occurrence in the corresponding port while propagating the topology change to the upper controller. Also, in case where a link in a topology table is not discovered a few seconds (for example, three seconds) or more, a change in the topology table due to link timeout is propagated to the controller. If a packet is not received during a constant time with respect to a specific flow and thus the corresponding flow is terminated, the SDN propagates a 'Flow Removal' message to the controller. And, the SDN propagates other various events that take place in the switch to the controller. The controller frequently receives such several events and re-calculates routing information and in accordance with the result, frequently updates (deletes and generates) a corresponding flow table to the lower switch, thereby providing a failure restoration operation. This finally causes a processing delay of the controller in itself, increasing a network processing cost.

Technical Problem

Accordingly, a solution that the present disclosure is to address relates to a method for operating a controller and a switch, providing an environment capable of rapidly detecting network failure taking place in an software-defined networking (SDN) using a Bidirectional Forwarding Detection (BFD) protocol standardized in IETF, and capable of dispersing to each switch an overhead concentrated on the controller, and a controller and a switch therefor.

That is, the solution is to provide a function of improving a failure repairing time, by decreasing complex routing calculation that a controller has ever performed in an existing SDN technology and an internal processing overhead time. Also, the solution is to provide a service restoration environment capable of effectively improving a propagation delay time, by utilizing a concise and simple BFD protocol and at failure occurrence, allowing even a switch itself to promptly update a corresponding flow table, not flow change through the controller.

Solution To Problem

According to one exemplary embodiment of the present disclosure, a method for operating a controller for network failure relieving in an Software-defined networking (SDN) includes the processes of transmitting, to the at least one switch, path information for at least one packet and a session establishment message that instructs the at least one switch to establish a session for detecting a link failure of the at least one packet based on information regarding a capability of detecting a link failure of the at least one switch; receiving, from the at least one switch, a session status message including information regarding a status of the session; if the status of the session is identified as the link failure, transmitting, to the at least one switch, updated path information for the at least one packet based on information of the session.

According to another exemplary embodiment of the present disclosure, a method for operating a switch for network failure relieving in an Software-defined networking (SDN) includes the processes of transmitting, to the controller, information regarding a capability of detecting a link failure; receiving, from a controller, path information for at least one packet and a session establishment message to establish a session for detecting the link failure of the at least one packet; transmitting, to the controller, a session status message including information regarding a status of the session; and if the status of the session is identified as the link failure, receiving, from the controller, updated path information for the at least one packet, which is updated based on information of the session.

According to a further exemplary embodiment of the present disclosure, a controller for network failure relieving in an Software-defined networking (SDN) includes at least one processor; and at least one transceiver operatively coupled to the at least one processor, wherein the at least one transceiver is configured to: transmit, to the at least one switch, path information for at least one packet and a session establishment message that instructs the at least one switch to establish a session for detecting a link failure of the at least one packet based on information regarding a capability of detecting a link failure of the at least one switch; receive, from the at least one switch, a session status message including information regarding a status of the session; and if the status of the session is identified as the link failure, transmit, to the at least one switch, updated path information for the at least one packet based on information of the session.

According to a yet another exemplary embodiment of the present disclosure, a switch for network failure relieving in an Software-defined networking (SDN) includes a protocol information management unit managing protocol information to which BFD performance capability information on a Bidirectional Forwarding Detection (BFD) function is added; a flow information management unit managing flow entry information received, if receiving the flow entry information with respect to a transmission path of the data from a controller that controls data path setting on the SDN; a session establishment unit establishing a session between with other switching terminals receiving a session establishment signal, if receiving the session establishment signal for establishment of the BFD function from the controller; a monitoring unit monitoring a network state with the other switching terminals, in accordance with session establishment; a switch interface unit transmitting protocol information to the controller if receiving a request for the protocol information from the controller, and receiving the flow entry information and the session establishment signal from the controller; and a switch memory unit storing the protocol information, the flow entry information and session establishment information according to the session establishment signal.

Advantageous Effects of Disclosure

The present disclosure can provide an environment capable of independently detecting failure even in a complex environment of an Software-defined networking (SDN).

Also, the present disclosure can decrease an event concentrated on a controller in the existing and decrease an algorithm calculation complexity of the controller in itself through the improvement of an Open flow standard protocol.

Also, the present disclosure is available for the existing resource without inputting of a new resource, by using a conventional legacy BFD protocol as it is.

Also, the present disclosure provides a network environment convenient to a user, because providing a situation-optimized service by applying an algorithm suitable to a topology environment of a switch.

The present disclosure provides an environment in which a controller can operate more precisely by decreasing a load of the controller in preparation for increasing a function and complexity of the controller in accordance with an increase of the demand for a continuous function and service.

BRIEF DESCRIPTION OF THE DRAWINGS

For more complete understanding of the present disclosure and effects thereof, the following description will be made with reference to the accompanying drawings and here, the same reference symbols denote the same parts.

FIG. 12 is table information illustrating one example of flow entry information that is generated in a controller.

FIG. 13 is table information illustrating one example of session establishment information that is generated in a controller.

FIG. 14 is table information illustrating one example of session mapping information that is generated in a controller.

DETAILED DESCRIPTION

FIG. 1 to FIG. 20 used to explain the principles of the present disclosure in the present patent specification are just for exemplification, and should not be interpreted as anything restricting the scope of the present disclosure. A person having ordinary knowledge in the art would understand that the principles of the present disclosure can be implemented even in any wireless communication system properly arranged.

The present disclosure provides a function of detecting failure quickly and restoring the failure intelligently by improving an existing operating routing algorithm through the maximal use of a Bidirectional Forwarding Detection (BFD) protocol resource that is being applied actively to an Software-defined networking (SDN) structure in an existing legacy system. Accordingly, the present disclosure provides an operation and algorithm capable of, in an SDN network, quickly detecting failure by respective switches using a BFD protocol among one another, and also extending a protocol message between a controller and a switch and maximally making short a failure restoration time.

Figure 1:
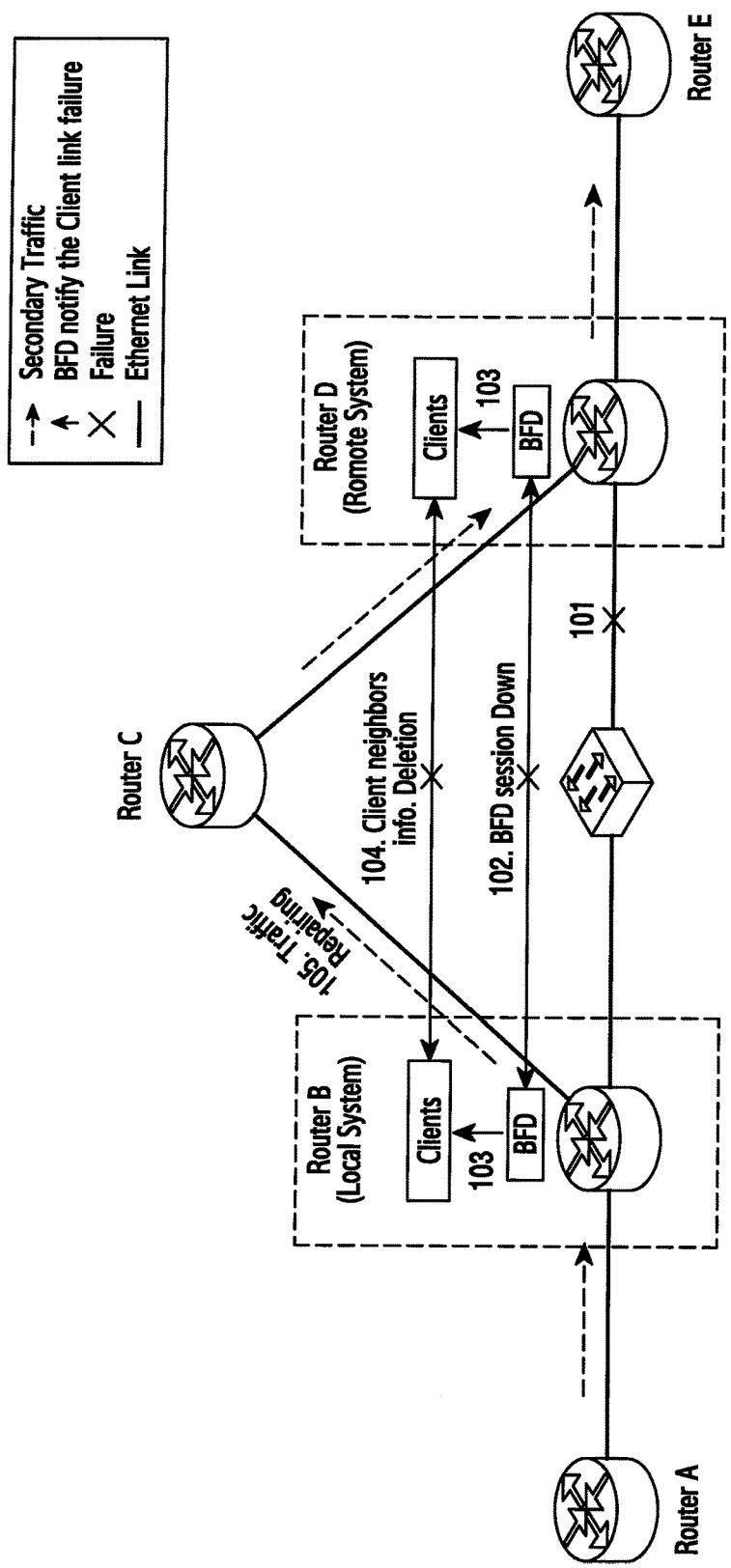
FIG. 1 is a reference diagram of one exemplary embodiment for explaining a BFD function for applying to a software-defined network (SDN).

FIG. 1 is a reference diagram of one exemplary embodiment for explaining a BFD function for applying to an SDN network. A BFD protocol relates to bidirectional transmission detection, and is a protocol used to detect a fault in a bidirectional path between two transmission engines (routers). BFD provides a function of detecting a neighbor fault as soon as a link is down. BFD provides a single mechanism that can be used for an active detection function in a protocol layer. The bidirectional fault search BFD detects a communication fault by a data plane next hop. As a protocol supporting BFD, there are OSPF (Open Shortest Path First), IS-IS (Intermediate System-to-Intermediate System), EIGRP (Enhanced Interior Gateway Routing Protocol), BGP (Border Gateway Protocol). If BFD is begun, a client protocol requests a BFD side to make and give adjacencies to a client neighbor. A BFD process makes an adjacent structure for a neighbor, and attempts session configuration. If a session is made and thus a status change becomes 'Up', a set transmission reception interval value is used. To transmit a BFD control packet timely, a BFD control packet transmission and link down detection function is executed by a pseudo-preemptive BFD process. BFD packets are unicasted on a point-to-point basis between neighbors of two places directly connected.

As illustrated in FIG. 1, a BFD session for a BFD function is generated between corresponding sections of a router B and a router D. If the session is generated, the router B and the router D exchange packets with each other at a high speed, while determining network failure or non-failure in the corresponding session. Thereafter, if network failure takes place in the corresponding session (101), a session UP state is changed into a session Down state (102) and thereafter, session status information that a network can be no longer formed through the corresponding session is propagated to a client side (103). Thereafter, a neighborhood relationship between the router B and the router D is ended (104), and a new transmission path is searched and thus a transmission path through a router C is newly generated (105).

Figure 2:
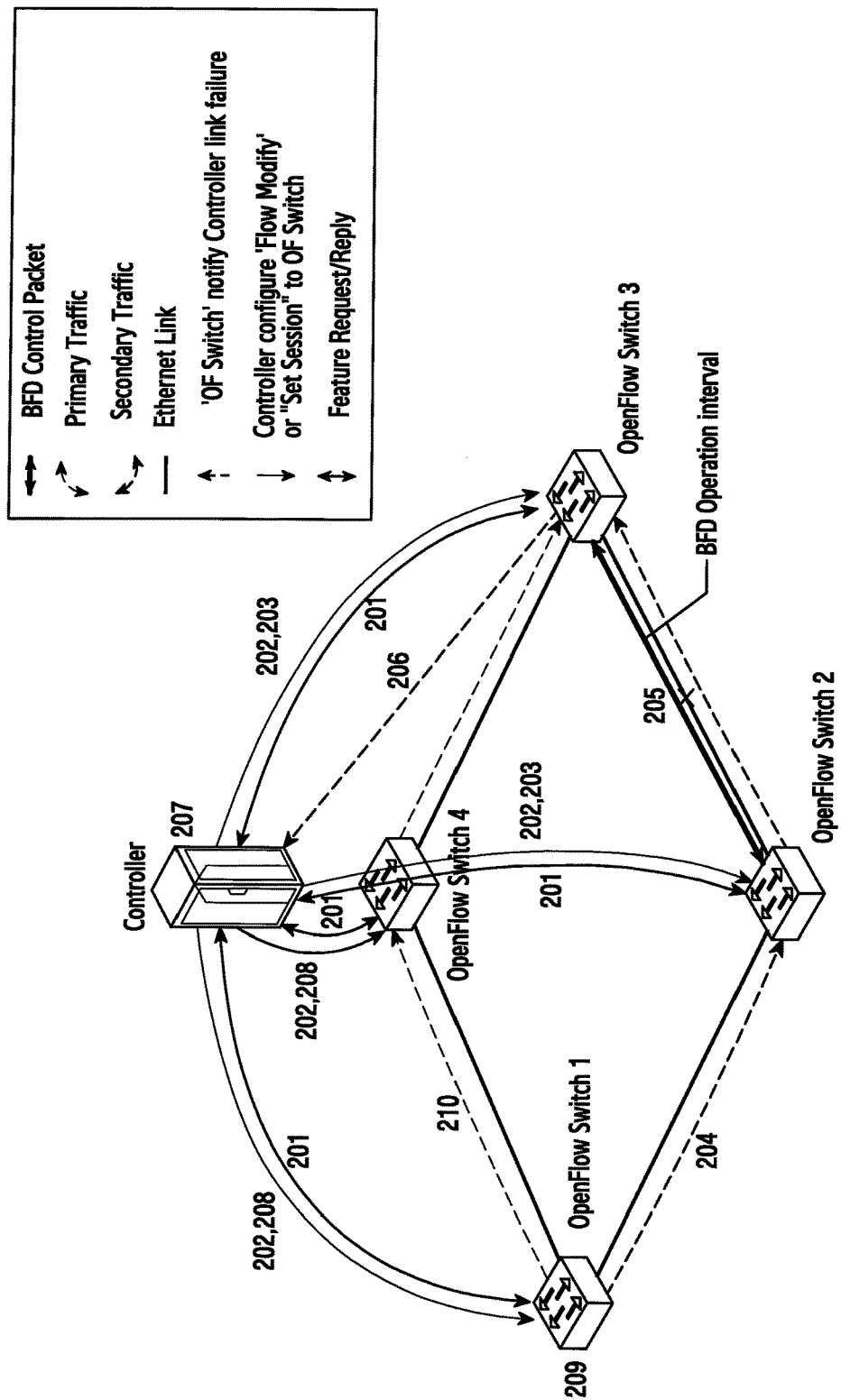
FIG. 2 is a reference diagram showing the whole flow for failure detection and restoration in an SDN to which a BFD function is applied in the present disclosure.
Figure 3:
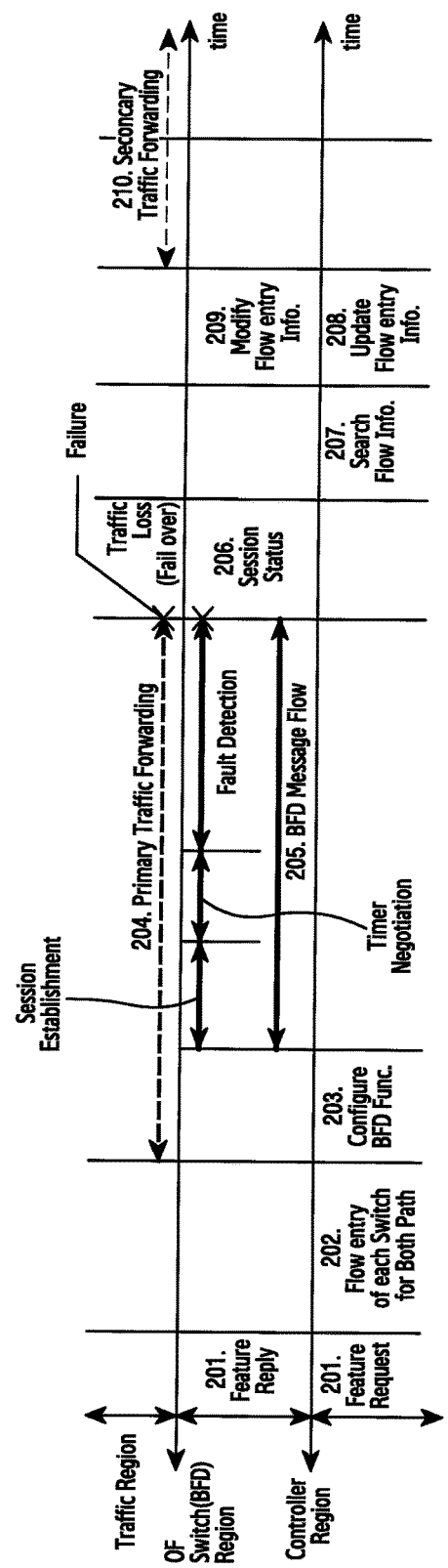
FIG. 3 is a reference diagram for explaining an operation performed between a controller and a switch with respect to each process illustrated in FIG. 2.

FIG. 2 is a reference diagram showing the whole flow for failure detection and restoration in an SDN to which a BFD function is applied in the present disclosure, and FIG. 3 is a reference diagram for explaining an operation performed between a controller and a switch with respect to each process illustrated in FIG. 2.

Referring to the content of FIG. 2 and FIG. 3, the whole operation procedure is given as follows.

A controller requests a feature request to each switch and, in response to the feature request, the each switch transmits a reply message to the controller, whereby the controller identifies a capability about a BFD function of each switch (201).

Thereafter, the controller generates and provides each flow entry for the respective switches (202).

Thereafter, the controller transmits a setting message for a BFD function operation to the respective switches (203). The respective switches transmit packets received by the switch in accordance with a preferred flow entry (204) and, on the other hand, generate a session by a BFD protocol in accordance with the BFD setting message transmitted from the controller, and perform fault detection about network failure or non-failure (205). That is, the respective switches establish sessions with the respective neighboring switches (Session Establishment), and identify a time of exchange of BFD packets for network failure detection (Timer Negotiation) and thereafter, detect network failure (Fault Detection).

If session failure occurs (traffic loss) between an OpenFlow switch 2 and an OpenFlow switch 3, the OpenFlow switch 2 and/or the OpenFlow switch 3 propagates a session status message to the controller (206).

Thereafter, the controller re-searches a flow entry using information included in the corresponding session status message, and updates the flow entry (207), and propagates the updated flow entry to each switch (208).

Thereafter, the switch receiving the updated flow entry modifies a flow entry that self has previously stored into the updated flow entry received from the controller (209).

Thereafter, the switch transmits the received packets to a destination in accordance with the updated flow entry (210).

Figure 4:
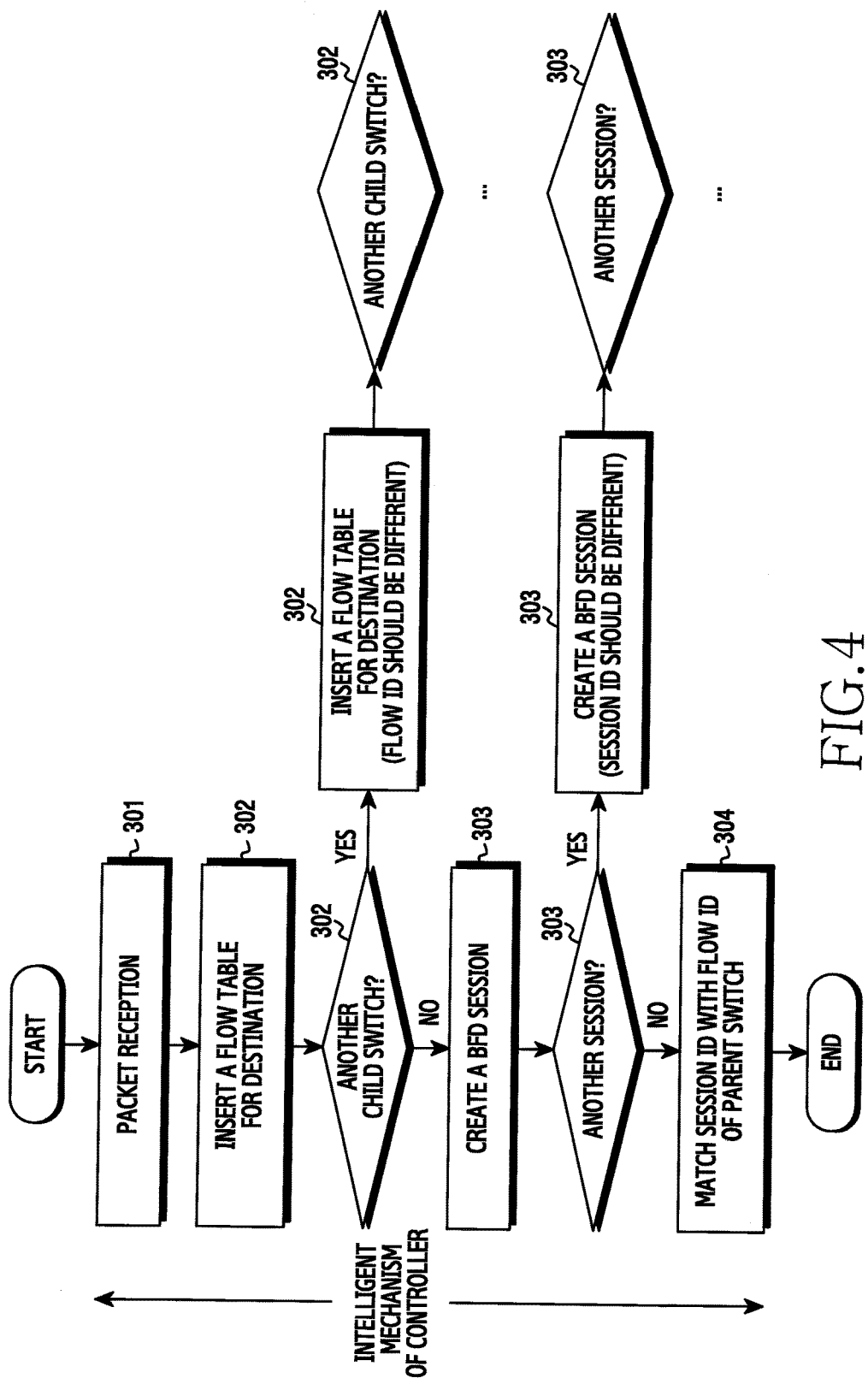
FIG. 4 is a flowchart for explaining an algorithm for decreasing a processing time of a controller at failure occurrence.

FIG. 4 is a flowchart for explaining an algorithm for flow entry generation and BFD session establishment in a controller.

If doing packet reception (301), the controller generates a flow entry for a destination with respect to corresponding all child switches (302).

The controller generates all BFD sessions corresponding to all switches that support a BFD operation (303). However, a corresponding session id should possess flow id information on each matched switch.

Thereafter, in case where a switch according to the flow entry corresponds to a parent switch, the controller maps a session ID according to session establishment with a flow ID of the patent switch (304).

Figure 5:
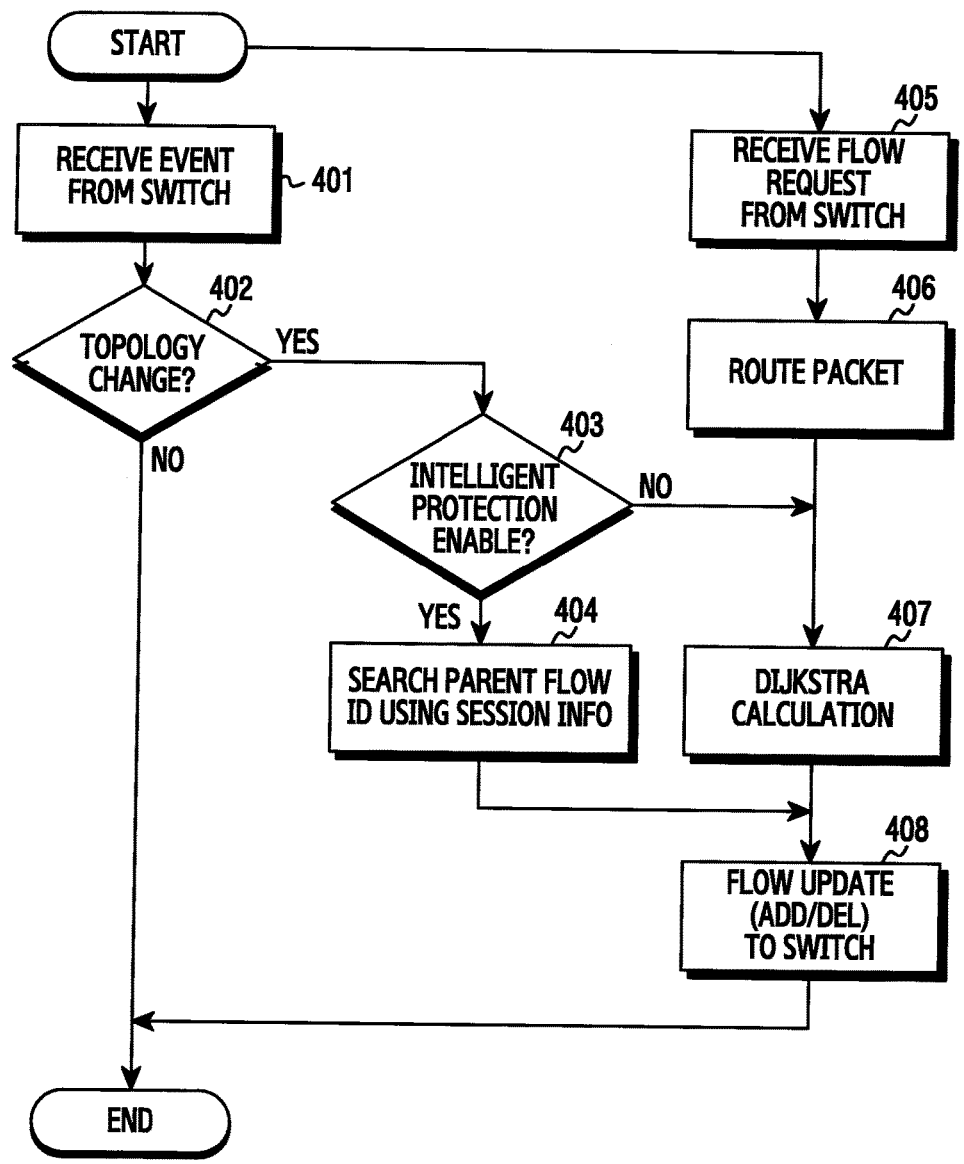
FIG. 5 is a flowchart for explaining an internal operation scheme of a controller according to the present disclosure.

FIG. 5 is a flowchart for explaining an internal operation scheme of a controller according to the present disclosure.

The controller receives from a switch a session status message corresponding to an event (401).

Thereafter, the controller receiving the session status message determines topology change or non-change, i.e., whether network failure has taken place (402).

If the topology change is generated, the controller determines whether to perform an intelligent protection enable operation (403). The intelligent protection enable operation represents performing a process of using mapped information of a flow ID of the parent switch and a session ID according to session establishment according to the present disclosure, to search a parent switch corresponding to a flow entry to update, and transmitting the updated flow entry.

If the intelligent protection enable operation is requested, the controller searches a parent switch using the mapped information of the flow ID of the parent switch and the session ID according to the session establishment (404).

Thereafter, the controller updates a preset flow entry, and transmits the updated flow entry to the switch (408).

But, if the intelligent protection enable operation is not requested, the controller performs Dijkstra calculation for general path search (407). The Dijkstra algorithm is an algorithm of getting the shortest path of a graph having a weight value. Dijkstra algorithm selects as a next peak a peak in which a sum of values of a start peak to a current peak and a weight value of an adjacent peak is least, and includes its path in the shortest path, and repeats this process until all peaks are selected. The controller proceeds to step 408 after performing the Dijkstra calculation.

On the other hand, if receiving a flow entry request from the switch (405), the controller transmits packets to respective switches (406), and proceeds to step 407 for path search.

Figure 6:
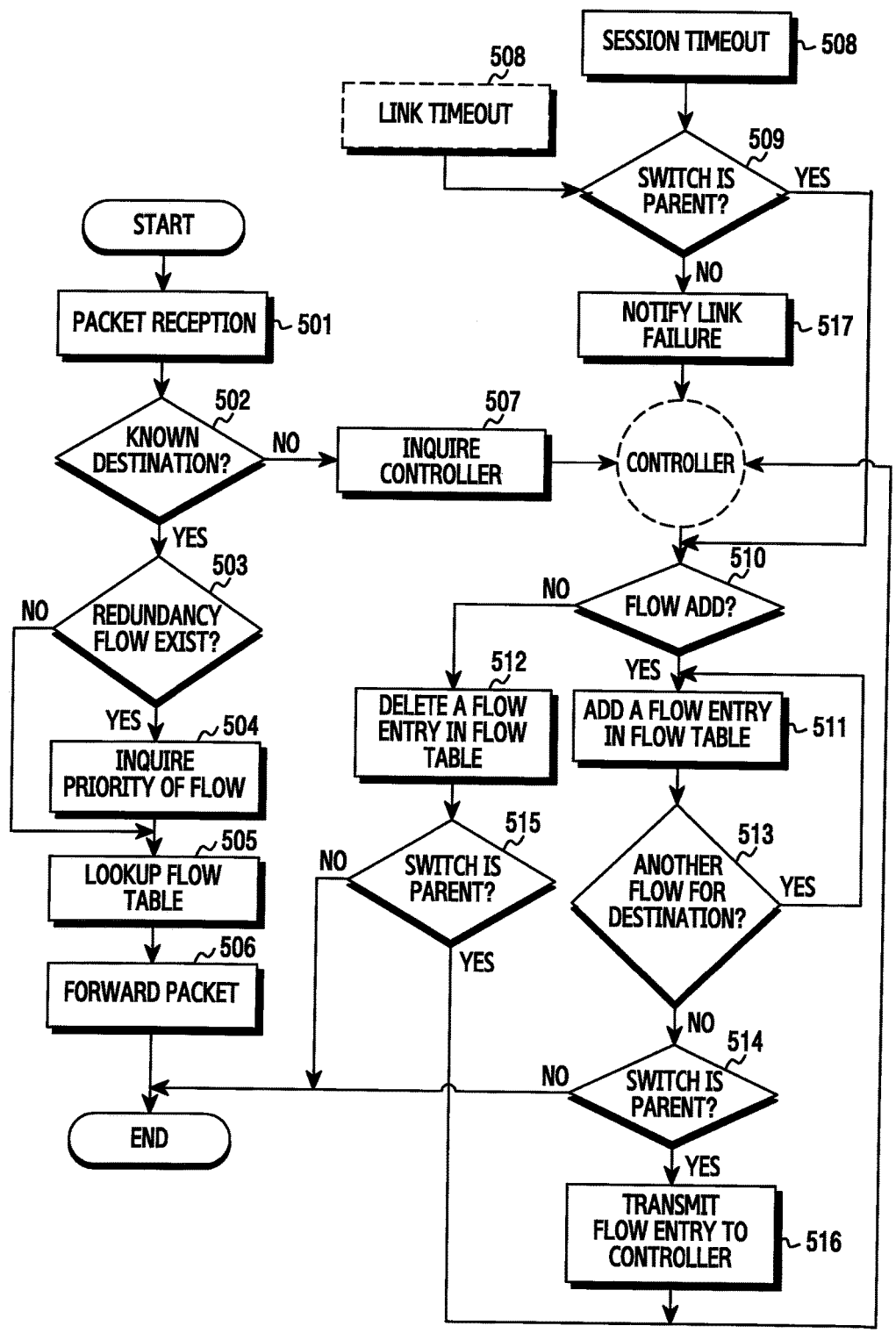
FIG. 6 is a flowchart for explaining an internal operation scheme of a switch according to the present disclosure.

FIG. 6 is a flowchart for explaining an internal operation scheme of a switch according to the present disclosure.

If receiving packets (501), the switch determines if flow entry information on a destination corresponding to the packet is searched (502).

If the flow entry information on the corresponding destination is searched, the switch determines if a flow entry corresponding to priority order among the flow entry information exists (503).

If the flow entry corresponding to the priority order exists, the switch requests and inquires flow entry information corresponding to the corresponding priority order (504, 505), and forwards corresponding packets in accordance with the searched flow entry information (506).

But, if the flow entry information on the corresponding destination is not searched in step 502, the switch requests flow entry information to the controller (507).

On the other hand, at the time of occurrence of a link timeout or session timeout event (508), the switch checks if the switch itself is a parent switch (509).

In case where a switch type is the parent switch, the switch itself determines whether to update a flow entry (510).

If desiring quick failure restoration, the switch itself updates the flow entry (511, 512, 513) and then, determines if it is the parent switch (514, 515) and then, transmits the changed flow entry to the controller (516).

On the other hand, in case where the switch type is a child switch in step 509, the switch transmits session status information representing link failure, i.e., network failure to the controller (517). Accordingly to this, the controller itself can just update the flow entry, instead of performing a complex algorithm operation.

Figure 7:
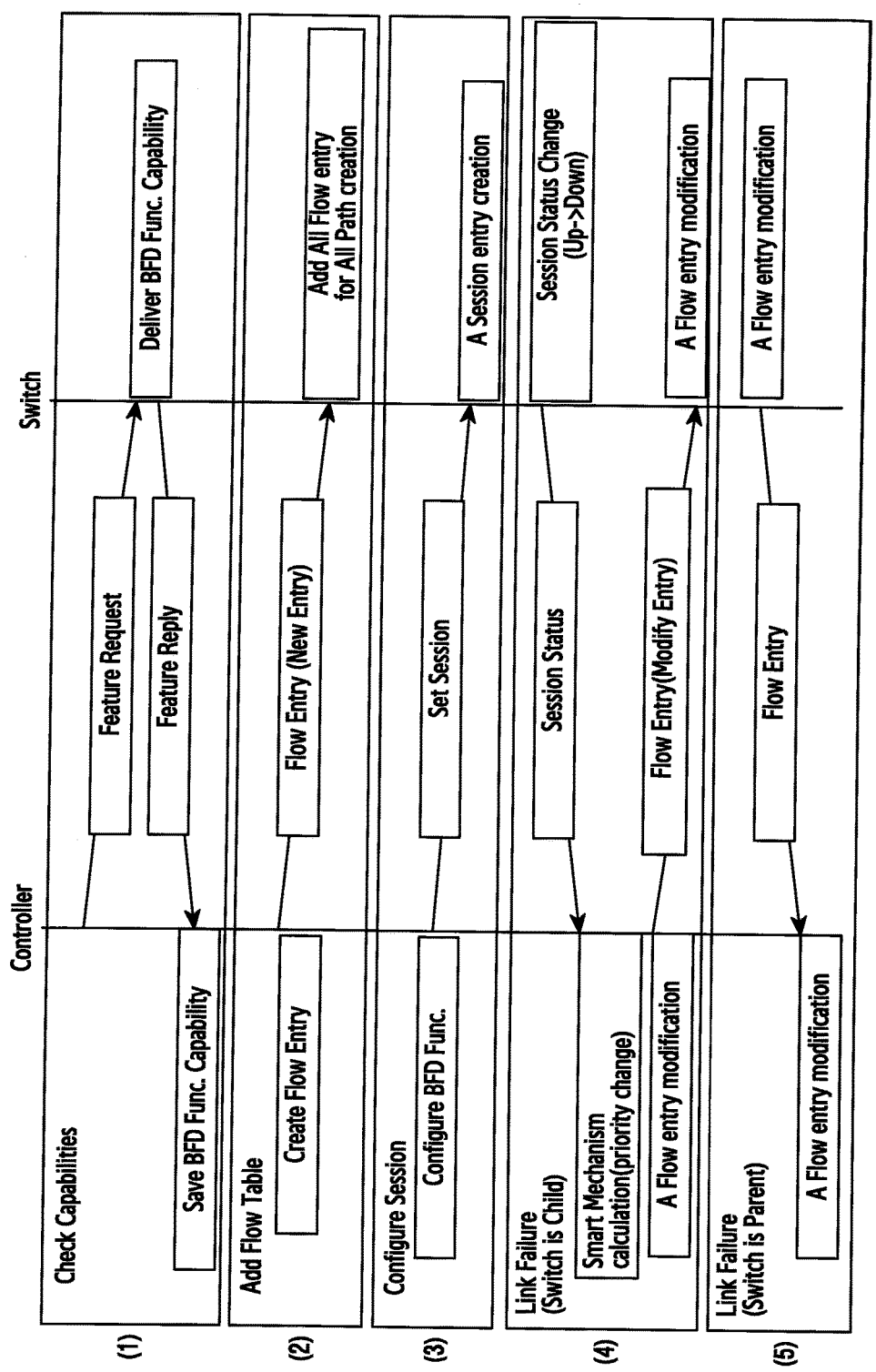
FIG. 7 is a reference diagram explaining an operation procedure between a controller and a switch for failure relieving in an SDN to which a BFD function is applied.

FIG. 7 is a reference diagram explaining an operation procedure between a controller and a switch for failure relieving in a Software Defined Networking to which a BFD function is applied.

The first process is a process of identifying the capabilities of the switch in the controller. If the controller requests to the switch a feature request of the switch according to an OpenFlow protocol, the switch transmits to the controller a feature reply having BFD function capability information that represents that self can perform a BFD function. If then, the controller saves the BFD function capability information of the switch.

The second process is a process of creating a flow entry table in the controller. If the controller generates a flow entry and transmits the generated flow entry to the switch, the switch adds flow entries for all transmission paths in accordance with the transmitted flow entry.

The third process is a process of establishing a session in the controller. If the controller forms session information on a BFD function and then, transmits a signal for session establishment to the switch, the switch establishes a session between other switches neighboring on self The fourth process is a process of, in case where network failure occurs between child switches among switches, relieving this. If detecting a session status change (a change from Up to Down), the child switch determines that it is network failure and transmits a session status signal about this to the controller. The controller receiving the session status signal changes priority corresponding to priority order for data transmission in previously generated and stored flow entry information, thereby updating the flow entry information. Thereafter, if the controller transmits the updated flow entry information to the switch, the switch modifies previously possessed flow entry information in accordance with the updated flow entry information transmitted in the controller.

Figure 8:
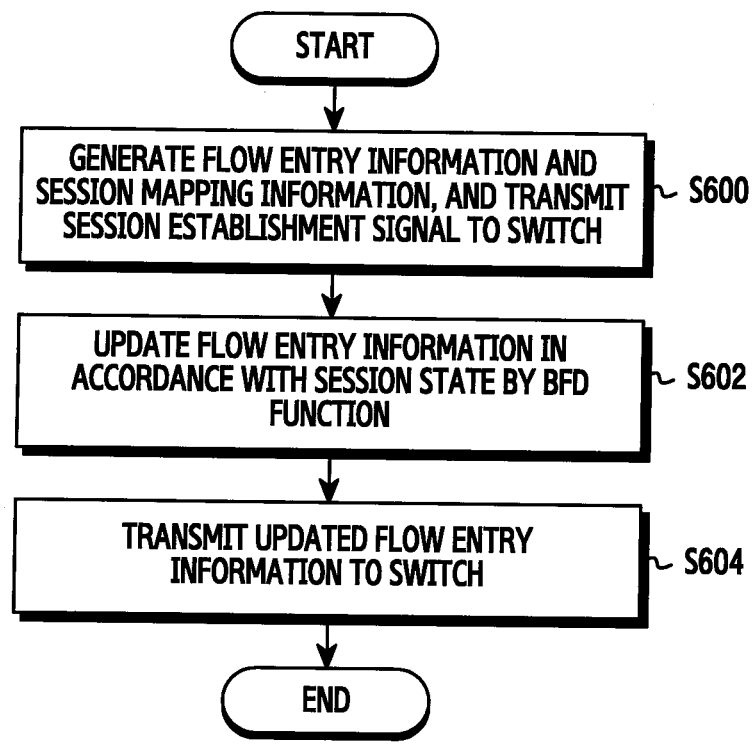
FIG. 8 is a flowchart of one exemplary embodiment explaining a method for operating a controller for network failure relieving in an SDN according to the present disclosure.

FIG. 8 is a flowchart of one exemplary embodiment explaining a method for operating a controller for network failure relieving in an SDN according to the present disclosure.

The controller generates flow entry information with respect to a transmission path of data via switches and session mapping information mapped with the flow entry information for a BFD function, in accordance with protocol information including BFD performance capability information on the Bidirectional Forwarding Detection (BFD) function transmitted from at least one or more switches among a plurality of switches, and transmits to the switch the generated flow entry information and a session establishment signal instructing establishment for the BFD function (step S600).

A process of generating the flow entry information and the session establishment information is given as illustrated in FIG. 8.

Figure 9:
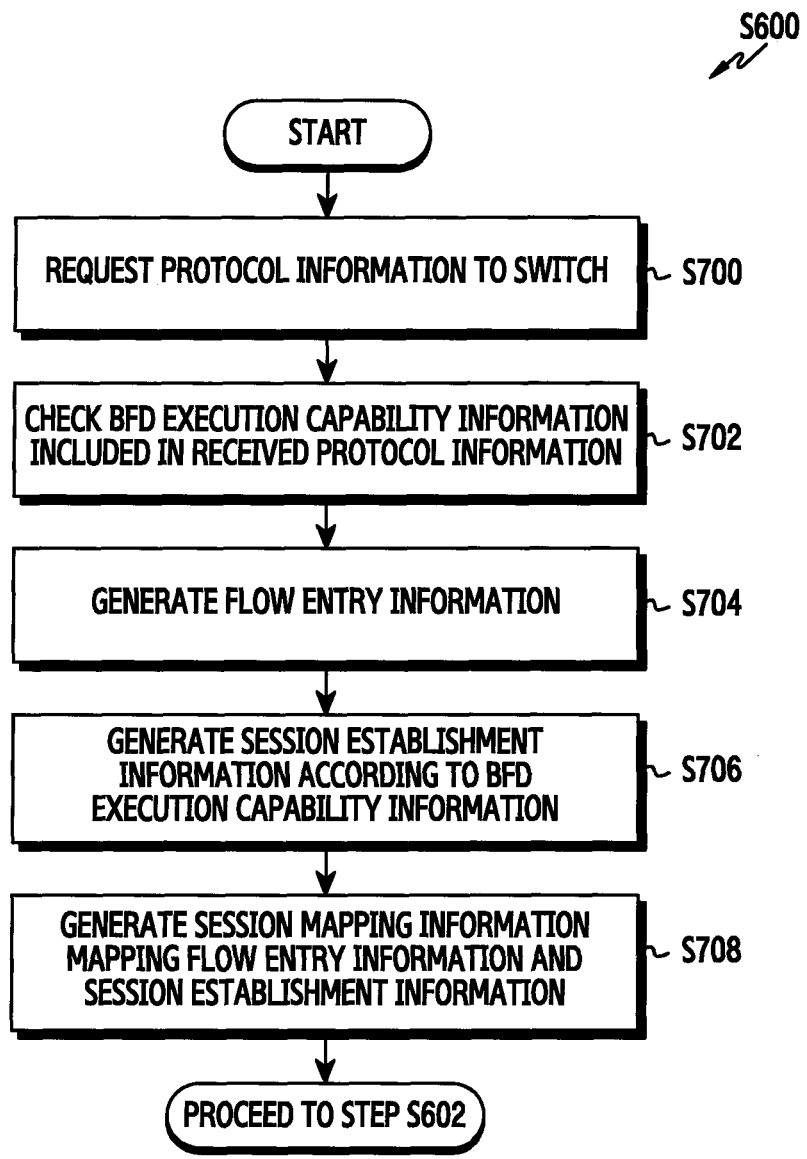
FIG. 9 is a flowchart of one exemplary embodiment for explaining about a process of generating flow entry information and session mapping information illustrated in FIG. 8.

FIG. 9 is a flowchart of one exemplary embodiment for explaining about a process of generating the flow entry information and the session mapping information illustrated in FIG. 8.

Figure 10:
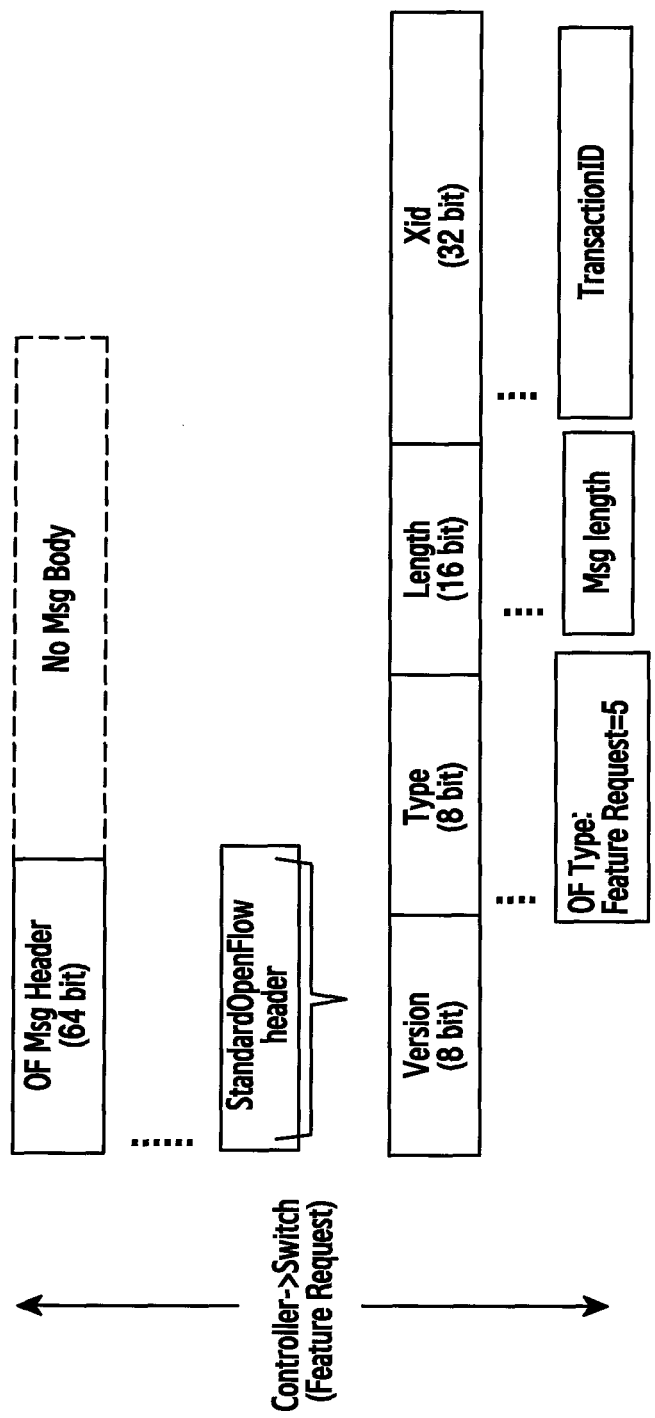
FIG. 10 is a packet structure illustrating one example of a request signal for request of protocol information that is transmitted to a switch from a controller.

Firstly, the controller requests protocol information to the switch (step S700). FIG. 10 is a packet structure illustrating one example of a request signal for request of the protocol information that is transmitted to the switch from the controller. The request signal illustrated in FIG. 10 is the same as a signal by an existing general OpenFlow protocol.

After step S700, the controller identifies BFD performance capability information included in the protocol information received from the switch (step S702). Here, the protocol information is information defined by an OpenFlow protocol for communication between the controller and the switch in an Software-defined networking (SDN).

Figure 11:
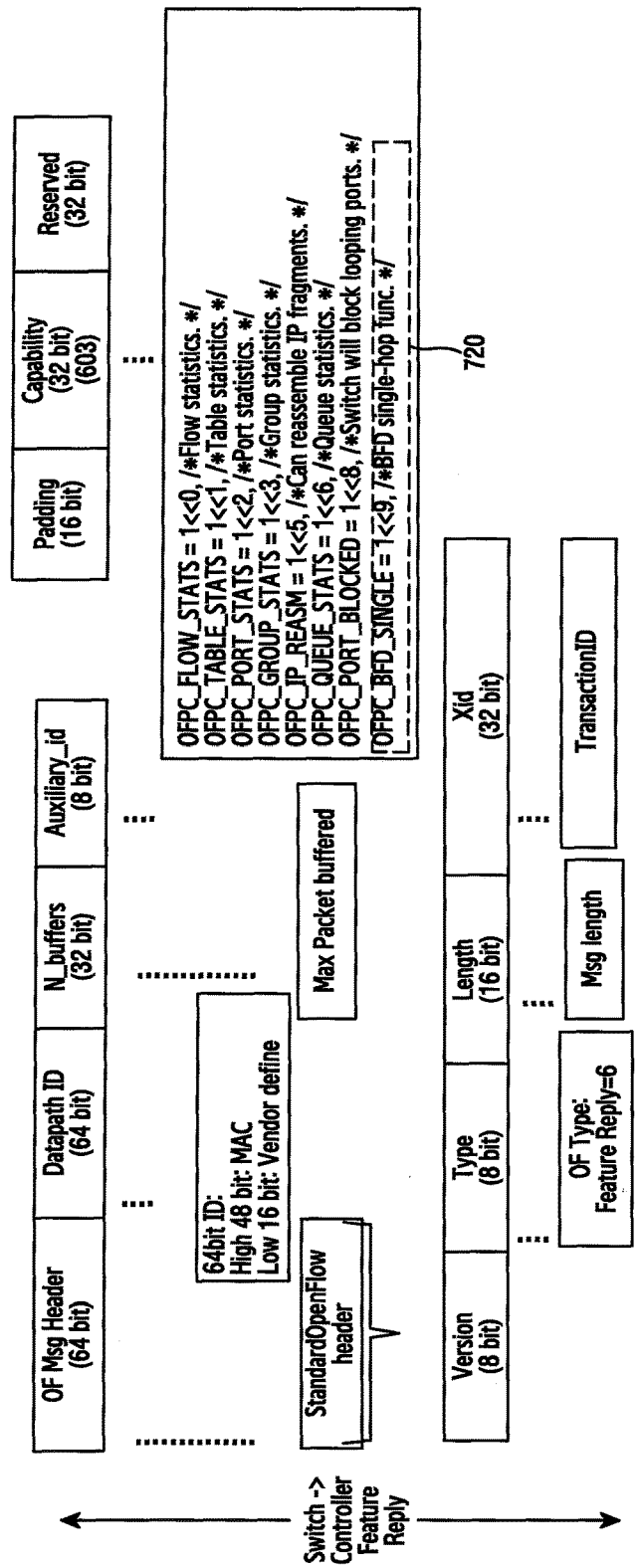
FIG. 11 is a packet structure illustrating one example of protocol information that is transmitted to a controller from a switch.

FIG. 11 is a packet structure illustrating one example of the protocol information that is transmitted to the controller from the switch. In content illustrated in FIG. 11, information included in a packet is the same as information defined by an OpenFlow protocol and, however, a feature portion of the present disclosure is to further include BFD performance capability information (for example, "OFP-C_BFD_SINGLE=1<<9/*BFD single-hop func*/" marked by an identification number 720) that represents that the corresponding switch can perform a thing relating to a Bidirectional Forwarding Detection (BFD) function, among information related with the capability of the switch. The controller identifies the BFD performance capability information included among the protocol information, thereby being capable of knowing that the corresponding switch can perform the BFD function.

After step S702, the controller generates flow entry information corresponding to a transmission path of data received by the switch (step S704). Here, the flow entry information includes identification information of a switch, destination address information on data received by the switch, port information of the switch and priority order information on a port that represents priority order for the data transmission in case where the port information corresponds to at least two or more.

FIG. 12 is table information illustrating one example of the flow entry information that is generated in the controller. As illustrated in FIG. 12, the table information includes, as flow header information, an IP address (for example, Dst ip:Host X) for a destination, port information (for example, Output to Port 1 or Output to Port 2) of the switch, priority order information (for example, Priority:1 or 2) about a port that represents priority order for data transmission. Also, the flow entry information includes a value (for example, 1 second) corresponding to link timeout as well, and includes identification information (not shown) of the switch corresponding to this flow entry information as well.

After step S704, the controller generates session establishment information in accordance with the BFD performance capability information (step S706). The session establishment information is information related with an attribute of a session formed between switches.

FIG. 13 is table information illustrating one example of the session establishment information that is generated in the controller, and includes session identification information (for example, Session ID: 1 or 2) set to the switch, Local IP information (for example, Local IP: A.A.A.A or C.C.C.C) allocated to port information of the switch, and peer IP information (for example, Peer IP: A.A.A.B or C.C.C.D) of another switch connected with the switch.

After step S706, the controller generates session mapping information using the generated flow entry information and session establishment information (step S708). The session mapping information represents information mapped between a switch according to flow entry and a switch according to session establishment. At this time, in case where the switch corresponds to a parent switch according to the flow entry information, the controller maps the session identification information according to the session establishment information with identification information of the parent switch.

FIG. 14 is table information illustrating one example of the session mapping information that is generated in the controller, and includes the identification information of the switch mapped with the session identification information, besides the aforementioned session establishment information. That is, the table information includes information (for example, Parent Flow ID: Switch-1) mapping the session identification information according to the session establishment information with the identification information of the parent switch, besides the session identification information (for example, Session ID: 1 or 2) set to the switch, the Local IP information (for example, Local IP: A.A.A.A or C.C.C.C) allocated to the port information of the switch, and the peer IP information (for example, Peer IP: A.A.A.B or C.C.C.D) of another switch connected with the switch.

The controller transmits to the switch the session establishment signal along with the generated flow entry information. Here, the session establishment signal indicates a signal instructing the establishment for the BFD function to the switch.

Figure 15:
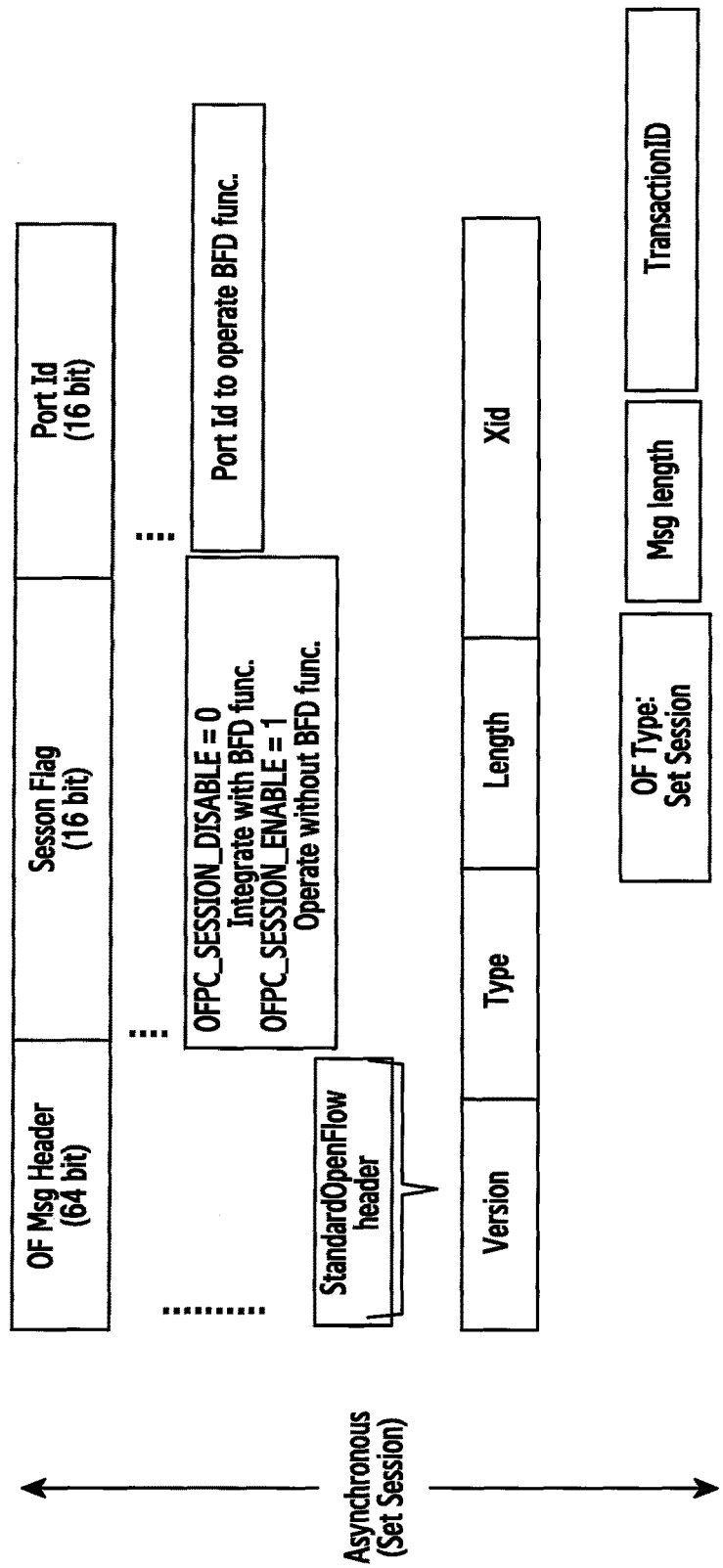
FIG. 15 is a packet structure illustrating one example of a session establishment signal that a controller transmits to a switch.

FIG. 15 is a packet structure illustrating one example of the session establishment signal that the controller transmits to the switch. As illustrated in FIG. 15, session flag information corresponds to an enable value or disable value about whether to enable the switch to establish a session. In case where the enable value corresponds to "1", the enable value corresponds to an instruction of instructing the switch to establish the session. Also, by transmitting port information, i.e., a port ID of the switch together, the session establishment signal designates in which port of the corresponding switch it is allowed to establish the session.

Thereafter, the switch receiving the session establishment signal together with the flow entry information establishes the session, and detects network failure or non-failure. Detailed content on this is described later.

After step S600, the controller updates the previously generated flow entry information in accordance with a session status by the BFD function transmitted from the switch (step S602). For example, if the controller receives from the switch a session status signal that is determined to be network failure in a state having the flow entry information corresponding to FIG. 12, the controller updates the previously generated and possessed flow entry information, to relieve the network failure. That is, the controller changes priority order Priority: 1 for Port 1 indicating priority order for data transmission as the previous flow entry information, into Priority: 2 and changes priority order Priority: 2 for Port 2 into Priority: 1.

On the other hand, the controller can receive session status information from the switch as described above, but can receive flow entry information that is updated in the switch (specifically, parent switch) itself in accordance with network failure as well. Accordingly to this, if receiving the updated flow entry information from the switch (specifically, parent switch), the controller updates previously generated flow entry information to correspond to the flow entry information that is updated from the switch. For example, in that even the switch stores the flow entry information corresponding to FIG. 12, if the flow entry information updated in the switch itself, that is, the flow entry information in which priority order Priority: 1 for Port 1 is updated into Priority: 2 and priority order Priority: 2 for Port 2 is updated into Priority: 1 is transmitted to the controller, the controller modifies previous flow entry information that self possesses to correspond with this updated flow entry information.

After step S602, the controller transmits the updated flow entry information to the switch (step S604). Particularly, in case where the switch corresponds to a parent switch according to the updated flow entry information, the controller transmits to the parent switch the updated flow entry information using the session mapping information. The parent switch receiving the updated flow entry information modifies the previously possessed flow entry information into the updated flow entry information. According to this, even though directly transmitting the updated flow entry information only to the parent switch without needing to transmit the updated flow entry information to a child switch, the controller can transmit data to a destination in accordance with an updated flow through the parent switch and therefore, can relieve the network failure rapidly.

Figure 16:
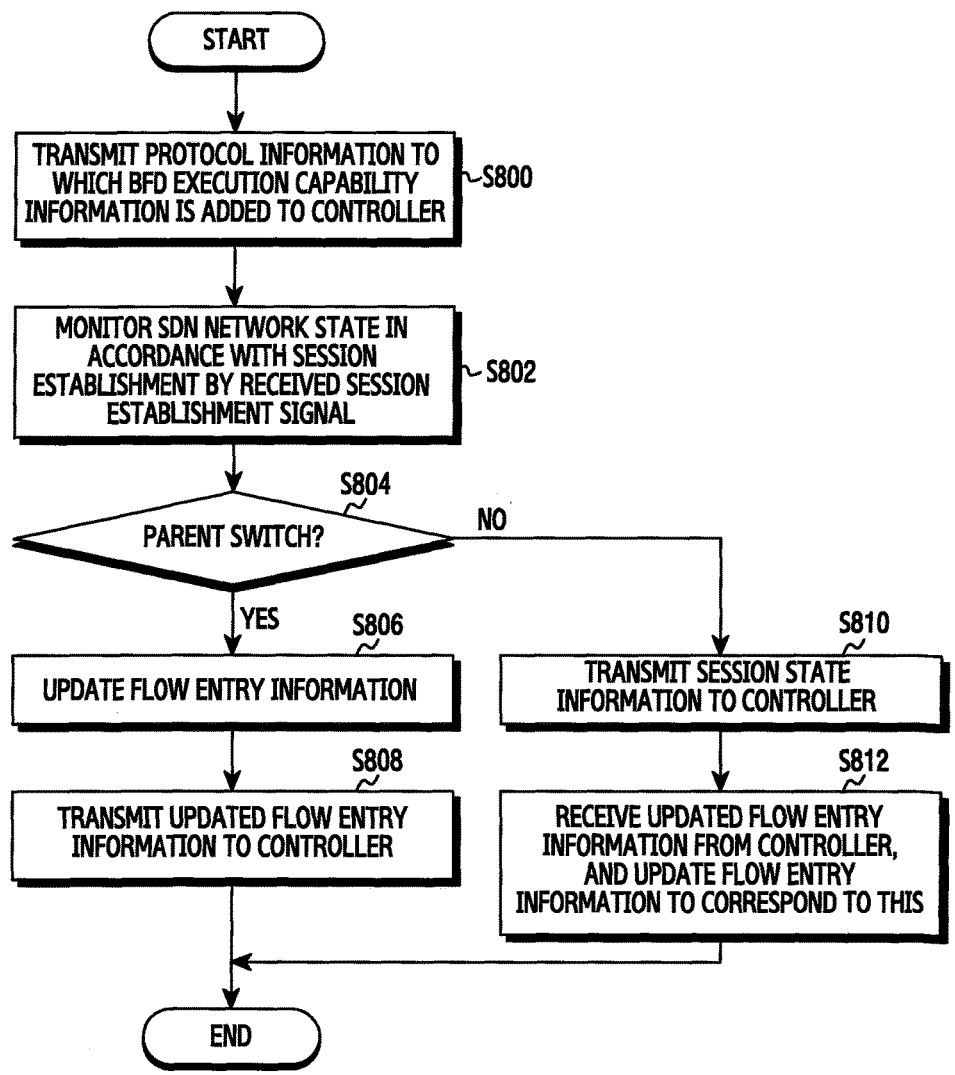
FIG. 16 is a flowchart of one exemplary embodiment explaining a method for operating a switch for network failure relieving in an SDN according to the present disclosure.

FIG. 16 is a flowchart of one exemplary embodiment explaining a method for operating a switch for network failure relieving in an SDN according to the present disclosure.

If the switch receives a request for protocol information from a controller that controls data path setting on the SDN, the switch adds BFD performance capability information on a BFD function to the protocol information and transmits the protocol information to the controller (step S800). FIG. 11 described above exemplifies the protocol information that the switch transmits to the controller. The protocol information includes the BFD performance capability information (for example, "OFPC_BFD_SINGLE=1<<9/*BFD single-hop func*/") on the BFD function.

After step S800, if the switch receives flow entry information with respect to a transmission path of data and a session establishment signal for establishment of the BFD function from the controller, the switch monitors a network state between with other switches in accordance with session establishment by the session establishment signal (step S802).

Figure 17:
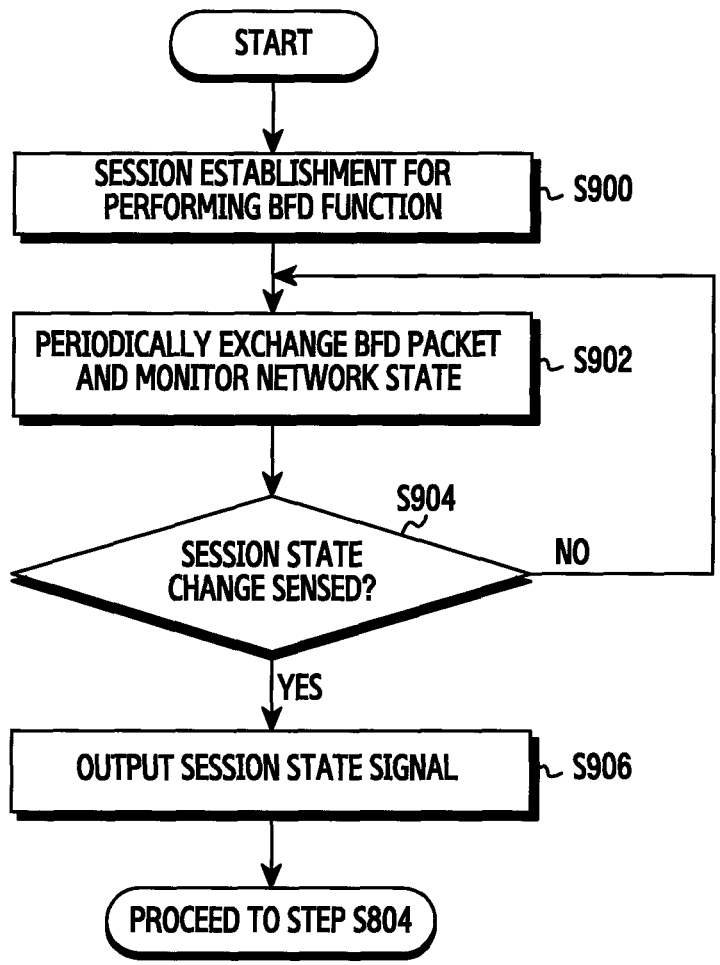
FIG. 17 is a flowchart of one exemplary embodiment for explaining about a process of monitoring a network state illustrated in FIG. 16.

A process of monitoring the network state between with the other switches in accordance with the session establishment is given as illustrated in FIG. 17.

FIG. 17 is a flowchart of one exemplary embodiment for explaining about a process of monitoring the network state illustrated in FIG. 16.

Firstly, the switch establishes sessions between with other switches so as to perform the BFD function, in accordance with a session establishment signal (step S900). The switch forms the sessions with neighboring switches in accordance with the session establishment signal transmitted from the controller (Session Establishment), and identifies a time of exchange of a BFD packet for network failure detection (Timer Negotiation). If the session is generated and a status change becomes 'Up', the set exchange time is used as a packet exchange interval value.

After step S900, the switch periodically exchanges BFD packets for determining network failure or non-failure between both ends of each of other switches in accordance with the session establishment, to monitor the network state (step S902). To transmit the BFD packets properly, a function of BFD control packet transmission and linkdown detection is executed. By transmitting on a point-to-point basis BFD packets between neighbor switches of two places directly connected, the switch monitors the network state.

After step S902, if detecting a change of a session status in course of performing the monitoring (step S904), the switch determines that it is network failure for the SDN and outputs a session status signal (step S906). If the session status is set to 'Up' corresponding to a normal value and the status is changed into 'Down', the switch outputs the session status signal that represents the network failure for the SDN.

Figure 18:
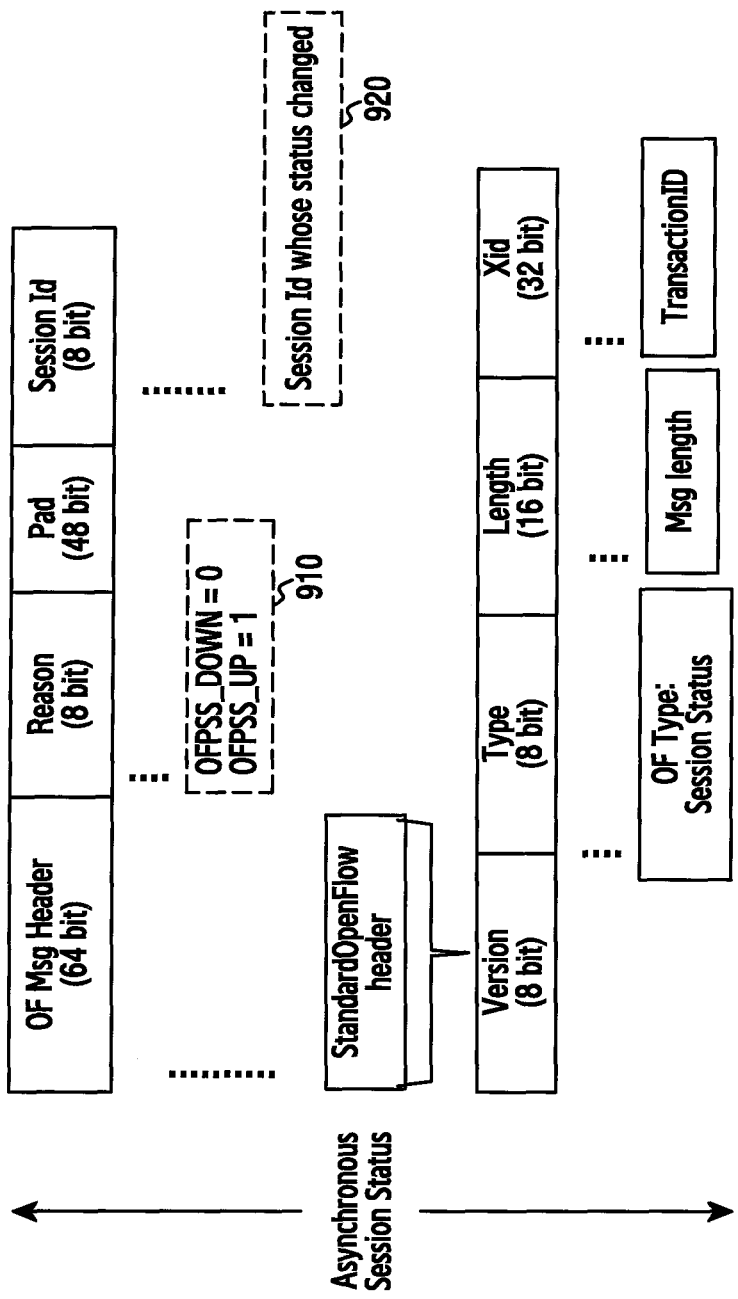
FIG. 18 is a packet structure illustrating one example of a session status signal that a switch transmits to a controller.

FIG. 18 is a packet structure illustrating one example of the session status signal that the switch transmits to the controller. As illustrated in FIG. 18, an identification number 910 denotes that the session status is set to 'Up' and the status is changed into 'Down', and an identification number 920 denotes information on a session ID whose session status is changed.

After step S802, if it is determined to be the network failure for the SDN as the monitoring result, the switch determines if self corresponds to any switch among a parent switch or child switch by flow entry information (step S804). The switch checks whether child switches branched from two or more ports that self possesses exist, thereby determining the parent switch or not. If self is not the parent switch, the switch determines that self is the child switch.

If the switch corresponds to the parent switch in step S804, the corresponding parent switch readjusts priority order for data transmission of previously received flow entry information and updates flow entry information (step S806). For example, if the switch has the flow entry information corresponding to FIG. 12 as the previous flow entry information, the switch changes priority order Priority:1 for Port 1 indicating priority order for data transmission into Priority: 2, and changes priority order Priority: 2 for Port 2 into Priority: 1.

After step S806, the switch transmits the updated flow entry information to the controller (step S808). For example, the switch transmits to the controller the flow entry information updating the priority order Priority: 1 for Port 1 into the Priority: 2, and updating the priority order Priority: 2 for Port 2 into the Priority: 1. Thereafter, the controller modifies the previously generated flow entry information to correspond with the updated flow entry information in accordance with the updated flow entry information transmitted from the switch.

On the other hand, if the switch corresponds to the child switch in step S804, the corresponding child switch transmits to the controller session status information that represents network failure (step S810).

After step S810, if the switch receives updated flow entry information from the controller, the switch updates previously received flow entry information in accordance with the updated flow entry information (step S812). For example, if the controller transmits to the switch flow entry information updating priority order Priority: 1 for Port 1 into Priority: 2, and updating priority order Priority: 2 for Port 2 into Priority: 1 with respect to the flow entry information illustrated in FIG. 12, the switch modifies the previous flow entry information that self possesses to correspond with the updated flow entry information transmitted from the controller.

Figure 19:
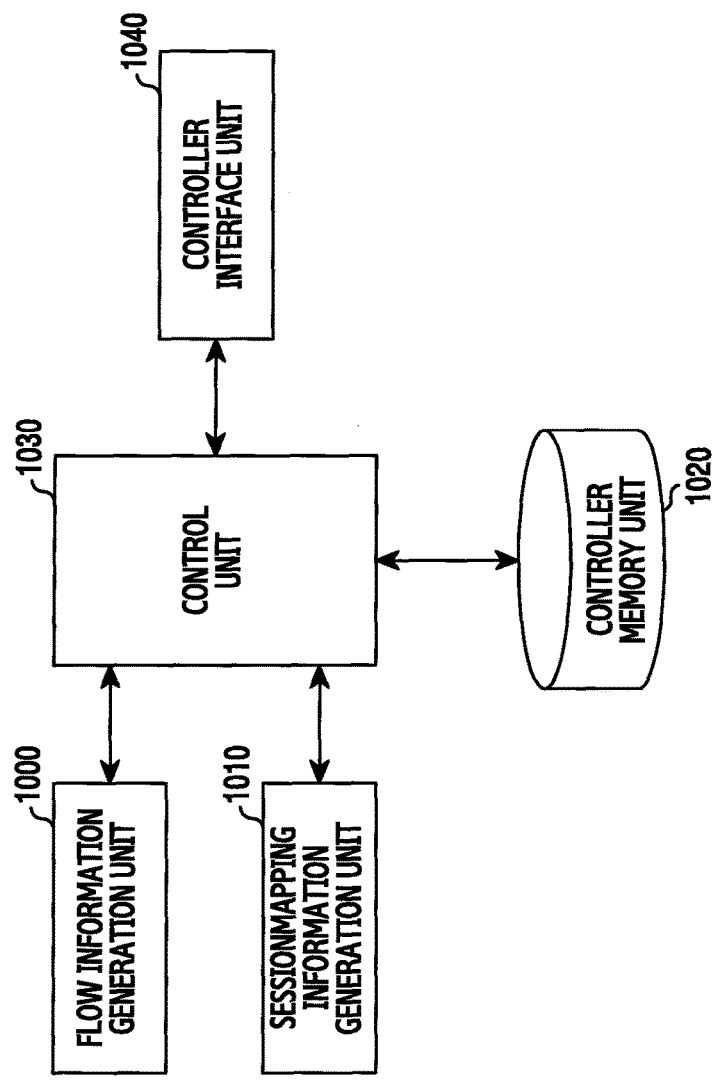
FIG. 19 is a block diagram of one exemplary embodiment explaining a controller for network failure relieving in an SDN according to the present disclosure.

FIG. 19 is a block diagram of one exemplary embodiment explaining a controller for network failure relieving in an SDN according to the present disclosure, and includes a flow information generation unit 1000, a session mapping information generation unit 1010, a controller memory unit 1020, a control unit 1030 and a controller interface unit 1040.

The flow information generation unit 1000 generates flow entry information in accordance with protocol information including BFD performance capability information on a BFD function transmitted from at least one or more switches. Here, the BFD performance capability information is information representing that a corresponding switch can perform a thing relating to the Bidirectional Forwarding Detection (BFD) function, among information relating with the capability of the switch.

If the control unit 1030 transmits to a switch a request signal for request of protocol information to the switch, the switch transmits to the controller the protocol information including the BFD performance capability information in reply to the request signal. If then, the control unit 1030 identifies the BFD performance capability information included in the protocol information, and instructs the flow information generation unit 1000 to generate flow entry information. Accordingly to this, the flow information generation unit 1000 generates the flow entry information including identification information of the switch, destination address information on data received by the switch, port information of the switch and priority order information on a port representing priority order for the data transmission in case where the port information corresponds to at least two or more. For example, as illustrated in FIG. 12, the control unit 1030 of the controller generates as flow header information an IP address (for example, Dst ip:Host X) for a destination, port information (for example, Output to Port 1 or Output to Port 2) of the switch, priority order information (for example, Priority: 1 or 2) about a port that represents priority order for data transmission, a value (for example, 1 second) corresponding to Link timeout and identification information of the switch.

The session mapping information generation unit 1010 generates session mapping information mapped with flow entry information for a BFD function, in accordance with BFD performance capability information. If the control unit 1030 instructs the session mapping information generation unit 1010 to generate the session mapping information in accordance with reception of protocol information, first, the session mapping information generation unit 1010 generates session establishment information corresponding to the BFD performance capability information. As illustrated in FIG. 13, the session mapping information generation unit 1010 generates the session establishment information related with an attribute of a session formed between the switches.

Thereafter, the session mapping information generation unit 1010 generates session mapping information using generated flow entry information and session establishment information. The session mapping information represents mapped information between a switch according to flow entry and a switch according to session establishment. At this time, in case where a switch corresponds to a parent switch according to the flow entry information, the session mapping information generation unit 1010 maps identification information of the parent switch and session identification information according to the session establishment information.

For example, as illustrated in FIG. 14, the session mapping information generation unit 1010 generates information (for example, Parent Flow ID: Switch-1) in which the identification information of the parent switch and the session identification information according to the session establishment information are mapped, besides the session identification information (for example, a Session ID: 1 or 2) set to the switch, Local IP information (for example, a Local IP: A.A.A.A or C.C.C.C) allocated to port information of the switch, and Peer IP information (for example, a Peer IP: A.A.A.B or C.C.C.D) of another switch connected with the switch.

The controller memory unit 1020 stores in a separate storage space each of flow entry information generated in the flow information generation unit 1000 and session mapping information generated in the session mapping information generation unit 1010.

The control unit 1030 controls to transmit to a switch generated flow entry information and/or a session establishment signal for establishment of a BFD function. The control unit 1030 instructs the controller interface unit 1040 to transmit the generated flow entry information to the switch. On the other hand, the control unit 1030 generates the session establishment signal that instructs the establishment for the BFD function to the switch, and instructs the controller interface unit 1040 to transmit the generated session establishment signal to the switch.

Accordingly to this, the controller interface unit 1040 transmits flow entry information and/or a session establishment signal to the switch.

Thereafter, the switch receiving the session establishment signal together with the flow entry information establishes a session, and detects network failure or non-failure. The switch transmits information on a session status to the controller, or transmits flow entry information that is updated in the switch itself to the controller.

If the controller interface unit 1040 receives the information on the session status from the switch, the control unit 1030 controls the flow information generation unit 1000 to update previously generated flow entry information in accordance with the session status by the BFD function. That is, if the control unit 1030 receives from the switch a session status signal that is determined to be network failure, the control unit 1030 instructs to update the flow entry information that is previously generated and stored in the controller memory 1020, to relieve the network failure. Accordingly to this, the flow information generation unit 1000 updates the flow entry information including identification information of the switch, destination address information on data received by the switch, port information of the switch and priority order information on a port that represents priority order for the data transmission in case where the port information corresponds to at least two or more.

On the other hand, if the controller interface unit 1040 receives flow entry information that is updated in the switch (particularly, parent switch) itself in accordance with network failure, the control unit 1030 controls to update previously generated flow entry information to correspond to the updated flow entry information transmitted from the switch. Accordingly to this, the flow information generation unit 1000 updates the flow entry information previously generated and stored in the controller memory 1020.

The control unit 1030 controls the controller interface unit 1040 to transmit updated flow entry information to the switch. Particularly, in case where the switch corresponds to a parent switch according to the updated flow entry information, the control unit 1030 controls to transmit the updated flow entry information to the parent switch using session mapping information. Accordingly to this, the controller interface unit 1040 transmits the updated flow entry information to the switch (particularly, parent switch).

The switch receiving the updated flow entry information modifies previously stored flow entry information into updated flow entry information. According to this, even though directly transmitting the updated flow entry information only to the parent switch without needing to transmit the updated flow entry information to a child switch, the controller can transmit data to a destination in accordance with an updated flow through the parent switch and therefore, can relieve network failure rapidly.

Figure 20:
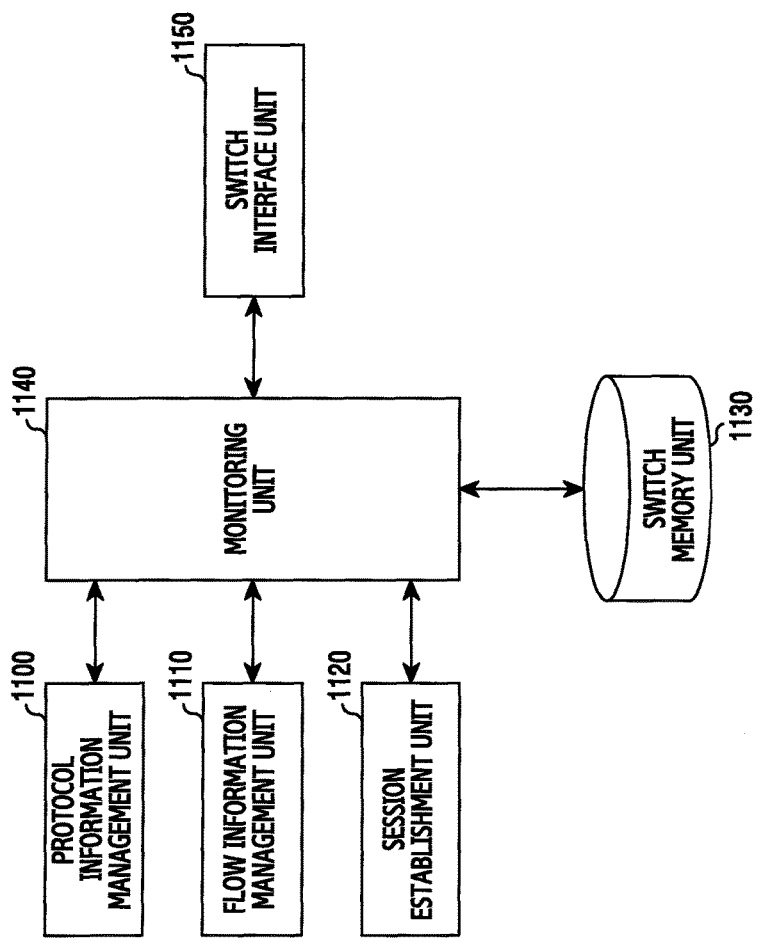
FIG. 20 is a block diagram of one exemplary embodiment explaining a switch for network failure relieving in an SDN according to the present disclosure.

FIG. 20 is a block diagram of one exemplary embodiment explaining a switch for network failure relieving in an SDN according to the present disclosure, and includes a protocol information management unit 1100, a flow information management unit 1110, a session establishment unit 1120, a switch memory unit 1130, a monitoring unit 1140 and a switch interface unit 1150.

The protocol information management unit 1100 manages protocol information to which BFD performance capability information on a BFD function is added. FIG. 11 mentioned above exemplifies the protocol information that the protocol information management unit 1100 manages, and the protocol information includes the BFD performance capability information on the BFD function.

If receiving flow entry information from a controller, the flow information management unit 1110 manages and stores the received flow entry information, and also manages the updating of the flow entry information.

If receiving a session establishment signal for establishment of a BFD function from the controller, the session establishment unit 1120 establishes a session between with other switching terminals receiving a session establishment signal. In accordance with the session establishment signal transmitted from the controller, the session establishment unit 1120 forms sessions with neighboring switches (Session Establishment), and identifies a time of exchange of a BFD packet for network failure detection (Timer Negotiation). If the session is generated and a status change becomes 'Up', the session establishment unit 1120 uses a set exchange time as a packet exchange interval value.

The switch memory unit 1130 stores protocol information, flow entry information and session establishment information according to a session establishment signal.

The monitoring unit 1140 monitors a network state with other switching terminals, in accordance with session establishment. The monitoring unit 1140 periodically exchanges BFD packets for determining network failure or non-failure between both ends of each of other switches, and monitors the network state. By transmitting on a point-to-point basis BFD packets between neighboring switches of two places directly connected, the monitoring unit 1140 monitors the network state.

If a session status is set to 'Up' corresponding to a normal value and the session status is changed into 'Down', the monitoring unit 1140 outputs a session status signal that represents network failure for the SDN.

If it is determined to be network failure for the SDN as the monitoring result, the monitoring unit 1140 determines if its own switch corresponds to any switch among a parent switch or child switch by flow entry information. The monitoring unit 1140 checks whether child switches branched from two or more ports that its own switch possesses exist, thereby determining the parent switch or not. If self is not the parent switch, the monitoring unit 1140 determines that self is the child switch.

If it is determined that its own switch is the parent switch, the monitoring unit 1140 instructs the updating of flow entry information to the flow information management unit 1110. Accordingly to this, the flow information management unit 1110 readjusts priority order for data transmission of the flow entry information stored in the switch memory unit 1130, in accordance with the instruction of the monitoring unit 1140, and updates the flow entry information. For example, if the switch memory unit 1130 stores the flow entry information corresponding to FIG. 12, the flow information management unit 1110 changes priority order Priority: 1 for Port 1 that represents priority order for data transmission into Priority: 2, and changes priority order Priority: 2 for Port 2 into Priority: 1.

The monitoring unit 1140 controls the switch interface unit 1150 to transmit to the controller the flow entry information updated in the flow information manage unit 1110. Accordingly to this, the switch interface unit 1150 transmits the updated flow entry information to the controller.

On the other hand, if it is determined that its own switch is a child switch, the monitoring unit 1140 controls the switch interface unit 1150 to transmit session status information representing network failure to the controller. Accordingly to this, the switch interface unit 1150 transmits the session status information to the controller.

If the switch interface unit 1150 receives updated flow entry information from the controller, the monitoring unit 1140 instructs the flow information management unit 1110 to update flow entry information. The flow information management unit 1110 modifies flow entry information stored in the switch memory unit 1130 to correspond with the updated flow entry information transmitted from the controller, in accordance with the instruction of the monitoring unit 114.

If receiving a request signal for protocol information stored in the switch memory unit 1130 from the controller, the switch interface unit 1150 transmits the protocol information to the controller in reply to the request signal. Also, the switch interface unit 1150 receives transmitted flow entry information and a session establishment signal from the controller. Also, as mentioned above, the switch interface unit 1150 transmits flow entry information updated in the flow information management unit 1110 to the controller, or receives flow entry information updated in the controller. Also, the switch interface unit 1150 transmits session status information generated in the monitoring unit 1140 to the controller.

A controller for network failure relieving in an Software-defined networking (SDN), includes a flow information generation unit generating flow entry information with respect to a transmission path of data via switches, in accordance with protocol information including BFD performance capability information on a Bidirectional Forwarding Detection (BFD) function transmitted from at least one or more switches; a session mapping information generation unit generating session mapping information mapped with the flow entry information for the BFD function, in accordance with the BFD performance capability information; a controller memory unit storing the generated flow entry information and session mapping information; a control unit controlling to transmit to the switch a session establishment signal for establishment of the BFD function; and a controller interface unit transmitting the flow entry information and the session establishment signal to the switch, and the control unit can control the flow information generation unit to update the flow entry information in accordance with a session status by the BFD function transmitted from the switch.

The control unit can request the protocol information to the switch and, if receiving the protocol information from the switch, identify the BFD performance capability information included in the protocol information, and instruct the flow information generation unit to generate the flow entry information, and instruct the session mapping information generation unit to generate the session mapping information.

In case where the switch corresponds to a parent switch according to the flow entry information, the session mapping information generation unit can map using identification information of the parent switch and session identification information according to session establishment information.

The flow entry information can include identification information of the switch, destination address information on the data received by the switch, and priority order information of port information that represents priority order for the data transmission in case where the port information going to a destination of the switch correspond to at least two or more.

The session mapping information can include session identification information set to the switch, local IP information allocated to the port information of the switch, peer IP information of another switch connected with the switch and parent switch identification information corresponding to a parent switch of the switch according to the flow entry information.

If receiving from the switch a session status signal that is determined to be network failure on the SDN, the control unit instructs the flow information generation unit to update the flow entry information, and the flow information generation unit can update the flow entry information in accordance with the instruction of the control unit.

If receiving from the switch flow entry information that is updated in accordance with network failure on the SDN, the control unit instructs the flow information generation unit to update the flow entry information, and the flow information generation unit can update the flow entry information stored in the controller memory unit to correspond with the updated flow entry information received, in accordance with the instruction of the control unit.

If the flow entry information is updated, the control unit controls to transmit the updated flow entry information to the switch, and the controller interface unit can transmit the updated flow entry information to the switch.

In case where the switch corresponds to a parent switch of the updated flow entry information, the control unit can control to transmit the updated flow entry information to the parent switch using the session mapping information.

A switch for network failure relieving in an Software-defined networking (SDN), can include a protocol information management unit managing protocol information to which BFD performance capability information on a Bidirectional Forwarding Detection (BFD) function is added; a flow information management unit managing flow entry information received, if receiving the flow entry information with respect to a transmission path of the data from a controller that controls data path setting on the SDN; a session establishment unit establishing a session between with other switching terminals receiving a session establishment signal, if receiving the session establishment signal for establishment of the BFD function from the controller; a monitoring unit monitoring a network state with the other switching terminals, in accordance with session establishment; a switch interface unit transmitting protocol information to the controller, if receiving a request for the protocol information from the controller, and receiving the flow entry information and the session establishment signal from the controller; and a switch memory unit storing the protocol information, the flow entry information and session establishment information according to the session establishment signal.

The monitoring unit can periodically exchange BFD packets for determining network failure or non-failure between both ends of each of the other switches and monitor a network state and, if detecting a session status change in course of executing the monitoring, determine that it is network failure on the SDN and output a session status signal.

If it is determined to be the network failure on the SDN, the monitoring unit determines if its own switch corresponds to any switch among a parent switch or a child switch by the received flow entry information and, if the its own switch corresponds to the parent switch, instructs the flow information management unit to update the flow entry information stored in the switch memory unit, and the flow information management unit can readjust priority order for data transmission of the flow entry information stored in the switch memory, in accordance with the instruction of the monitoring unit, and update the flow entry information.

The switch interface unit can transmit the updated flow entry information to the controller.

If it is determined to be network failure on the SDN, the monitoring unit determines if its own switch corresponds to any switch among a parent switch or a child switch by the received flow entry information and, if the its own switch corresponds to the child switch, controls the switch interface unit to transmit session status information that represents network failure to the controller, and the switch interface unit can transmit the session status information to the controller.

If receiving the updated flow entry information from the controller, the flow information management unit can update the flow entry information stored in the switch memory unit in accordance with the updated flow entry information.

While the present disclosure has been shown and described by limited exemplary embodiments and drawings, the present disclosure is not limited to the aforementioned exemplary embodiments, and is available for various changes and modifications from this statement by a person having ordinary knowledge in the art to which the present disclosure belongs. For one example, in the exemplary embodiments of the present disclosure, a description has been made for a case, but the protection scope of the present disclosure will not necessarily be limited to this.

The present disclosure can record in a computer-readable recording media a program instruction for performing an operation implemented by various computers. The computer-readable recording media can include a program instruction, a data file, a data structure, etc. singly or in combination. The program instruction can be things specially designed and constructed for the present disclosure or can be a thing well-known to and usable by those skilled in the art. In an example of the computer-readable recording media, a magnetic media such as a hard disk, a floppy disk, and a magnetic tape, an optical recording media such as a CD-ROM and a DVD, a Magneto-Optical Media such as a floptical disk, and a hardware device specially configured to store and perform a program instruction such as a ROM, a RAM, a flash memory, etc. are included. An example of the program instruction includes not only a mechanical language code such as a code made by a compiler but also a high-level language code executable by a computer using an interpreter, etc. In case where all or some of base stations or relays described in the present disclosure are implemented by a computer program, even the computer-readable recording media storing the computer program is included in the present disclosure. Therefore, the scope of the present disclosure should not be limited to and defined by the described exemplary embodiments, and should be defined by not only claims described below but also equivalents to the claims.

What is claimed is:

1. A method for operating a controller, the method comprising:
    transmitting, to at least one switch, a request for protocol information;
    identifying bidirectional forwarding detection (BFD) performance capability information included in the protocol information received from the at least one switch;
    generating path information for at least one packet;
    generating a session establishment message according to the BFD performance capability information;
    generating session mapping information regarding a corresponding relationship between the path information and a session using the path information and the session establishment message;
    transmitting, to the at least one switch, the session mapping information, the path information for the at least one packet and the session establishment message that instructs the at least one switch to establish the session for detecting a link failure of the at least one packet based on the BFD performance capability information;
    receiving, from the at least one switch, a session status message including information regarding a status of the session; and
    in response to identifying the status of the session as the link failure, transmitting, to the at least one switch, updated path information for the at least one packet based on information of the session.

2. The method of claim 1, wherein generating the session mapping information comprises in response to identifying the at least one switch as being corresponding to a parent switch according to the path information, mapping an identifier of the parent switch and a session identifier according to the session establishment message.

3. The method of claim 1, wherein the session mapping information comprises an identifier of the at least one switch, local internet protocol (IP) address allocated to each port of the at least one switch, peer IP address of at least another switch connected with the at least one switch and a parent switch identifier corresponding to a parent switch of the at least one switch according to the path information.

4. The method of claim 1, wherein the path information comprises an identifier of the at least one switch, a destination address of the at least one packet, and a priority order of ports for transmitting the at least one packet.

5. The method of claim 1, wherein transmitting the updated path information comprises, in response to receiving path information that is updated according to the link failure from the at least one switch, updating the path information to correspond to the path information received from the at least one switch.

6. The method of claim 1, wherein transmitting the updated path information to the at least one switch, in response to identifying the at least one switch as being corresponding to a parent switch dependent on the updated path information, includes transmitting to the parent switch the updated path information using session mapping information.

7. A method for operating a switch, the method comprising:
    receiving, from a controller, a request for protocol information;
    transmitting, to the controller, the protocol information including bidirectional forwarding detection (BFD) performance capability information;
    receiving, from the controller, session mapping information, path information for at least one packet and a session establishment message to establish a session for detecting a link failure of the at least one packet based on the BFD performance capability information;
    transmitting, to the controller, a session status message including information regarding a status of the session; and
    in response to identifying the status of the session as the link failure, receiving, from the controller, updated path information for the at least one packet, which is updated based on information of the session,
    wherein the session mapping information is regarding a corresponding relationship between the path information and the session using the path information and the session establishment message.

8. The method of claim 7, wherein transmitting the session status message comprises:
    establishing a session between at least another switch so as to perform bidirectional forwarding detection (BFD) function, in accordance with the session establishment message;
    periodically exchanging BFD packets for identifying the link failure between both ends of the at least another switch in accordance with the session establishment message, and monitoring a state of at least one link between the switch and at least another switch; and
    in response to identifying the link failure, generating the session status message.

9. The method of claim 7, further comprising:
    in response to identifying the link failure for the at least one packet, determining whether the switch corresponds to a switch among a parent switch or a child switch based on the path information;
    in response to identifying the switch as being corresponding to the parent switch, updating the path information by updating a priority order of ports of the switch for transmitting the at least one packet; and
    transmitting the updated path information to the controller.

10. The method of claim 7, further comprising:
    in response to identifying the link failure for the at least one packet, whether the switch corresponds to a switch among a parent switch or a child switch based on the path information; and
    in response to identifying the switch as being corresponding to the child switch, transmitting session status message indicating a link failure to the controller.

11. The method of claim 10, further comprising, in response to receiving updated path information from the controller, updating the previously received path information in accordance with the updated path information.

12. The method of claim 7, wherein transmitting information regarding a capability of detecting a link failure comprises transmitting a message including 'open flow protocol capability_bidirectional forwarding detection_single (OFPC_BFD_SINGLE)' field representing capability of performing a bidirectional forwarding detection (BFD) single-hop function.

13. An apparatus of a controller, the apparatus comprising:
    at least one processor; and
    at least one transceiver operatively coupled to the at least one processor,
    wherein the at least one transceiver is configured to:
        transmit, to at least one switch, a request for protocol information;
        identify bidirectional forwarding detection (BFD) performance capability information included in the protocol information received from the at least one switch;
        generate path information for at least one packet;
        generate a session establishment message according to the BFD performance capability information;
        generate session mapping information regarding a corresponding relationship between the path information and a session using the path information and the session establishment message;
        transmit, to the at least one switch, the session mapping information, the path information for the at least one packet and the session establishment message that instructs the at least one switch to establish the session for detecting a link failure of the at least one packet based on the BFD performance capability information;
        receive, from the at least one switch, a session status message including information regarding a status of the session; and
        in response to identifying the status of the session as the link failure, transmit, to the at least one switch, updated path information for the at least one packet based on information of the session.

14. The apparatus of claim 13, wherein in response to identifying the at least one switch as being corresponding to a parent switch according to the path information, the at least one processor is configured to map an identifier of the parent switch and a session identifier according to the session establishment message.

15. The apparatus of claim 13, wherein the path information comprises an identifier of the at least one switch, a destination address of the at least one packet, and a priority order of ports for transmitting the at least one packet.

16. The apparatus of claim 13, wherein the session mapping information comprises an identifier of the at least one switch, local internet protocol (IP) address allocated to each port of the at least one switch, peer IP address of at least another switch connected with the at least one switch and a parent switch identifier corresponding to a parent switch of the at least one switch according to the path information.

17. The apparatus of claim 13, wherein in response to receiving path information that is updated according to the link failure from the at least one switch, the at least one processor is configured to update the path information to correspond to the path information received from the at least one switch.

18. The apparatus of claim 13, wherein transmitting the updated path information to the at least one switch, in response to identifying the at least one switch as being corresponding to a parent switch dependent on the updated path information, includes transmitting to the parent switch the updated path information using session mapping information.

* * * * *